US009524526B2

(12) United States Patent
Ajmera et al.

(10) Patent No.: US 9,524,526 B2
(45) Date of Patent: Dec. 20, 2016

(54) DISAMBIGUATING AUTHORS IN SOCIAL MEDIA COMMUNICATIONS

(75) Inventors: Jitendra Ajmera, New Delhi (IN); Ashish Verma, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 611 days.

(21) Appl. No.: 13/448,515

(22) Filed: Apr. 17, 2012

(65) Prior Publication Data

US 2013/0275438 A1 Oct. 17, 2013

(51) Int. Cl.
*G06F 7/00* (2006.01)
*G06F 17/30* (2006.01)
*G06Q 50/00* (2012.01)

(52) U.S. Cl.
CPC .................................... *G06Q 50/01* (2013.01)

(58) Field of Classification Search
CPC ................................................ G06F 17/30041
See application file for complete search history.

(56) References Cited

U.S. PATENT DOCUMENTS 6,480,885 B1 11/2002 Olivier
7,310,676 B2 12/2007 Bourne
8,812,495 B1 * 8/2014 Pragada ............ G06F 17/30958 707/723
2010/0049684 A1 * 2/2010 Adriaansen ....... G06F 17/30424 706/46
2010/0106702 A1 * 4/2010 Strumpf et al. .............. 707/706
2010/0125632 A1 5/2010 Leonard
2010/0174748 A1 * 7/2010 Strumpf et al. .............. 707/780
2010/0274815 A1 * 10/2010 Vanasco ........................ 707/798
2011/0078190 A1 3/2011 Samuel et al.
2013/0232159 A1 * 9/2013 Daya ...................... G06Q 50/01 707/758

OTHER PUBLICATIONS

Fredrik Johansson; Detecting Mulitple Aliases in Social Media; 2013; Swedish Defence Research Agency.*
Fabricio Benevenuto; Characterizing User Behavior in Online Social Networks;ACM; 2009; p. 49-62.*
(Continued)

*Primary Examiner* — Mariela Reyes
*Assistant Examiner* — Jermaine Mincey
(74) *Attorney, Agent, or Firm* — Ryan, Mason & Lewis, LLP

(57) ABSTRACT

A method, an apparatus and an article of manufacture for mapping authors across multiple forums. The method includes creating a database that contains publicly observable information pertaining to multiple authors from multiple forums, generating a mapping between at least a first one of the authors from one of the forums and at least a second one of the authors from another of the forums in the database based on a comparison of structured information, unstructured user generated content information and network information, and generating a score of mapping between the first and the second authors by considering a weighted sum of the number of times the structured information, the unstructured user generated content information and the network information match between the first and the second authors.

10 Claims, 3 Drawing Sheets

(56) References Cited

OTHER PUBLICATIONS

Danowski, Identifying Networks of Semantically-Similar Individuals from Public Discussion Forums, Advances in Social Networks Analysis and Mining (ASONAM), 2010 International Conference, Aug. 9-11, 2010.
Levin et al., Using Genetic Programming to Evaluate the Impact of Social Network Analysis in Author Name Disambiguation, downloaded Feb. 7, 2012, pp. 1-12.
Chakarvarthy et al., Efficiently Linking Text Documents with Relevant Structured Information, pp. 667-678, VLDB 2006.
Brizan et al., A Survey of Entity Resolution and Record Linkages Methodologies, pp. 41-50, vol. 6, Issue 3, Communications of the IIMA, 2006.
Bhattacharya et al., Structured Entity Identification and Document Categorization: Two Tasks with One Joint Model, ACM International Conference on Knowledge Discovery and Data Mining (SIGKDD), Las Vegas, Aug. 2008.
Tang et al., A Bipartite Graph Based Social Network Splicing Method for Person Name Disambiguation. SIGIR'11 Proceedings of the 34th International ACM SIGIR Conference on Research and Development in Information Retrieval, Jul. 24-28, 2011.

* cited by examiner

DISAMBIGUATING AUTHORS IN SOCIAL MEDIA COMMUNICATIONS

FIELD OF THE INVENTION

Embodiments of the invention generally relate to information technology, and, more particularly, to social media communications.

BACKGROUND

With new social media forums emerging everyday and the participation on these forums increasing, it has become useful to identify if two authors writing on two different social media forums correspond to the same person or not. This process is referred to herein as disambiguating authors. This presents an important challenge in analyzing social media communications. By way of example, if a product company is attempting to assess how many people like or dislike their product/services, provide customer care, or promote their products based on social media communications, the company will likely wish to ascertain if the same person is writing or posting relevant comments on multiple social media outlets. Further, the company may even wish to identify a customer record in their databases corresponding to this individual.

Accordingly, as the number of people participating in social media forums and the number of such forums increase, there is a need of disambiguating (or matching) participants across social media forums. Disambiguation authors presents a challenge, additionally, given that most forums do not allow accessing details such as e-mail addresses or telephone numbers of participants to external entities.

SUMMARY

In one aspect of the present invention, techniques for disambiguating authors in social media communications are provided. An exemplary computer-implemented method for mapping authors across multiple forums can include steps of creating a database that contains publicly observable information pertaining to multiple authors from multiple forums, generating a mapping between at least a first one of the authors from one of the forums and at least a second one of the authors from another of the forums in the database based on a comparison of structured information, unstructured user generated content information and network information, and generating a score of mapping between the first and the second authors by considering a weighted sum of the number of times the structured information, the unstructured user generated content information and the network information match between the first and the second authors.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes disambiguating authors on social media forums. At least one embodiment of the invention includes generating a mapping of authors across social media forums, and also can include dealing with situations where other specific datasets such as customer records of a company are available. In such cases, an aspect of the invention includes establishing a mapping of entities found in the specific datasets to authors on social media forums.

An internal customer database can be treated as another forum and customers' records can be mapped to social media authors. Applications of such disambiguation can include, for example, smart customer care centers, targeted marketing and other applications involving social media unstructured data analysis.

An aspect of the invention includes incorporating datasets that contain both structured as well as unstructured data. Accordingly, both structured and unstructured data are utilized for the purpose of disambiguating authors. Additionally, an aspect of the invention also includes utilizing connections among entities within multiple datasets (friend lists, etc.). Further, at least one embodiment of the invention includes outputting author mappings on social media forums.

As detailed herein, an example embodiment of the invention includes creating databases that contain publicly observable information such as author handle, author name, friends list, posts written by the author and any profile information such as location, gender, email, telephone number, etc. As used herein, "posts" include anything that is created or shared by an author such as a short write-up, a blog, a document (video, audio, etc.), email, customer care log, etc.

After creating these databases, potential author mappings are first generated based on structured information such as first name, last name, gender, location, email, telephone number (if available) and author handle. In at least one embodiment of the invention, a more refined mapping is inferred within these potential mappings based on the content of the author posts. This mapping makes use of named entities referred to in the post content of authors such as telephone numbers, email addresses, person names, location names, URLs, nouns, synonyms of nouns, etc. A weighted count of number of such entities matching across authors provides a score of mapping between two authors across social media forums. The mappings can be further refined by considering a friend list of one author on one forum mapped to the friend list of another author on another forum. The final output is a database which stores pairs of authors across social media forums and a corresponding mapping score.

Figure 1:
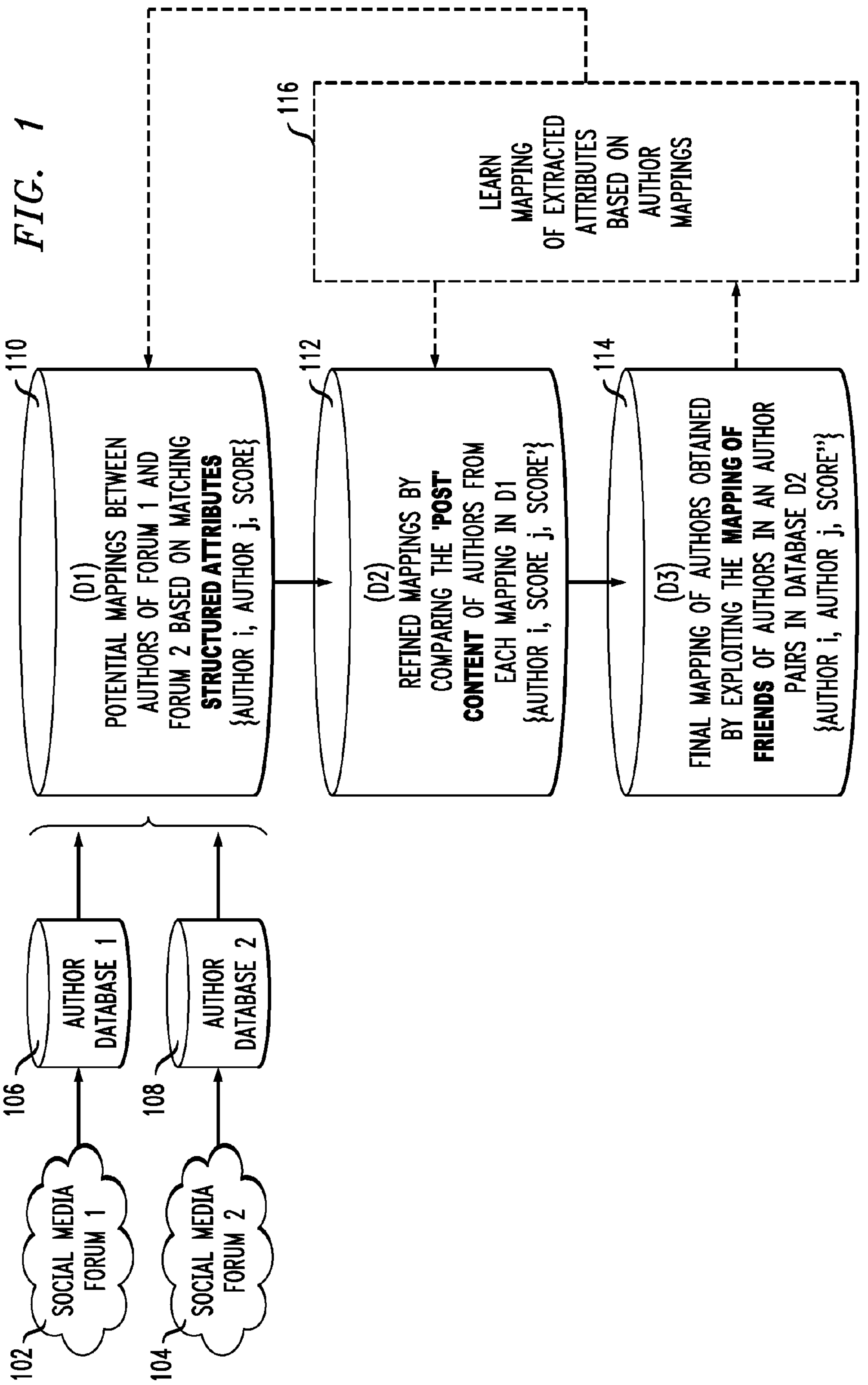
FIG. 1 is a block diagram illustrating an example embodiment, according to an aspect of the invention.

FIG. 1 is a block diagram illustrating an example embodiment, according to an aspect of the invention. By way of illustration, FIG. 1 depicts components used in mapping authors on two social media forums. As illustrated, social media forum (1) 102 provides input to author database (1) 106 and social media forum (2) 104 provides input to author database (2) 108. The author databases provide input to module (D1) 110, which computes and stores potential mappings between authors of forum 102 and forum 104 based on matching structured attributes {author i, author j, score}.

The structured attributes can include first name, last name, date of birth, email address, gender, location, telephone number, author handle, home page, as well as any other forum-specific attribute. These structured attributes are assigned individual weights which denote the relative importance of that attribute. The weights add up to 1. In accordance with at least one embodiment of the invention, these weights can be determined using a mix of human knowledge sources and automatic learning techniques. By way of example, human knowledge can include the notion that an email address is a unique feature of a person and would provide a higher weightage to the email feature compared to for instance, a first name, which can be shared by many people.

The mapping score between two authors across two different forums is then computed as the weighted count of attributes matching between the two authors. A special case arises when deterministic attributes such as telephone number or email addresses are available and match exactly for two authors on two forums. In this special case, the authors are mapped deterministically and no further processing is required.

As also depicted in FIG. 1, module 110 provides input to module (D2) 112, which determines (and stores) refined mappings by comparing the post content of authors from each mapping in module 110 {author i, score j, score'}. In matching post content, information can be extracted from what authors write on forums such as, for example, mentions of the following: named entities, person names, telephone numbers, email addresses, uniform resource locators (URLs), location/city names, (relevant) nouns, synonyms of (relevant) nouns, spelling variants of (relevant) nouns, and other specified attributes. Similar to the actions carried out in module 110, weights are assigned to each of these factors which define their relevance. For example, matching of person names in two posts may be a better indication compared to matching of any two nouns. Similarly, an exact match of nouns can be weighted more than synonym matching of nouns. Also similar to the actions carried out by module 110, the refined scoring is computed as the weighted count of post content attributes matching between two authors.

Additionally, FIG. 1 depicts that module 112 provides input to module (D3) 114, which determines (and stores) a final mapping of authors obtained by utilizing the mapping of friends of authors in author pairs stored in module (D2) 112 {author i, author j, score"}. Two authors are more likely to be the same person if their friends on individual frames are also mapped (after the actions carried out by module 112 noted above) to be similar people. The final mapping score includes computing a sum of mapping scores between all pairs of friends of the two authors. For example, suppose that 'author i' on forum (1) has N1 friends on forum (1) and 'author j' on forum (2) has N2 friends on forum (2). In this case, the final mapping score is computed as the (score obtained module 112)*(sum of mapping scores between all pairs of N1 friends on forum (1) and N2 friends on forum (2)).

Some forums have explicit notion of friends list and can be utilized in the manner mentioned above. There are also cases when this information is not explicitly available. In these cases, according to at least one embodiment of the invention, an implicit friends list can be extracted by considering the interaction among friends. For example, when a person replies to, mentions or shares content written by another person, these two entities can be assumed to be friends for the purposes of this step. The information then can be used in exactly the same manner above.

FIG. 1 additionally depicts module 116, which learns mapping of extracted attributes based on author mappings, and can interact with modules 110, 112 and 114 accordingly. Also, at least one embodiment of the invention includes learning synonyms of mappings for extracted attributes. While creating profiles on social media forums, most people use variations of terms. For example, an author might mention 'CMU' on one forum and 'Carnegie-Mellon University' on another. Once authors have been mapped (as detailed above), module 116 can learn such mapping of attributes. This process can run iteratively to improve the author and the attribute mappings.

Figure 2:
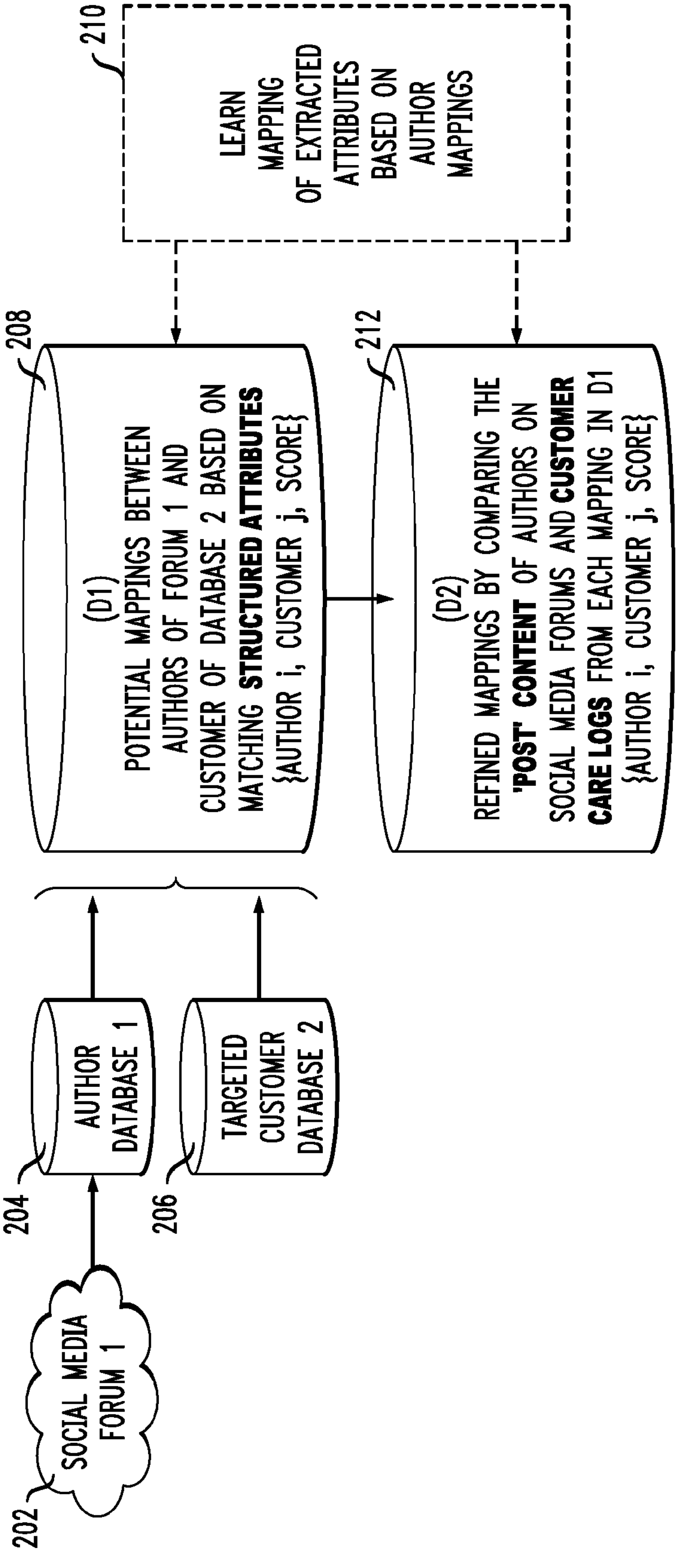
FIG. 2 is a block diagram illustrating an example embodiment, according to an aspect of the invention.

FIG. 2 is a block diagram illustrating an example embodiment, according to an aspect of the invention. By way of illustration, FIG. 2 depicts components used in mapping authors on a social media forum and targeted data (for example, customer records). Specifically, FIG. 2 depicts a social media forum (1) 202, which provides input to author database (1) 204, which, along with targeted customer database (2), provides input to module (D1) 110, which computes and stores potential mappings between authors of forum 202 and customers of database 206 based on matching structured attributes {author i, customer j, score}.

Similar to FIG. 1, FIG. 2 also depicts module 208 providing input to module (D2) 212, which determines (and stores) refined mappings by comparing the post content of authors on social media forums and customer care logs from each mapping in module 208 {author i, customer j, score}. FIG. 2 additionally depicts module 210, which learns mapping of extracted attributes based on author mappings, and can interact with modules 208 and 212 accordingly.

In contrast to FIG. 1, FIG. 2 presents a scenario where the objective is to map authors on a social media forum to the customers in the customer records of an enterprise. Differences with the scenario depicted in FIG. 1 include: the step of mapping friends is not performed because this information is not available, and the post content for the customer in the customer record is replaced with the internal customer care logs, emails transcribed phone calls, etc.

Figure 3:
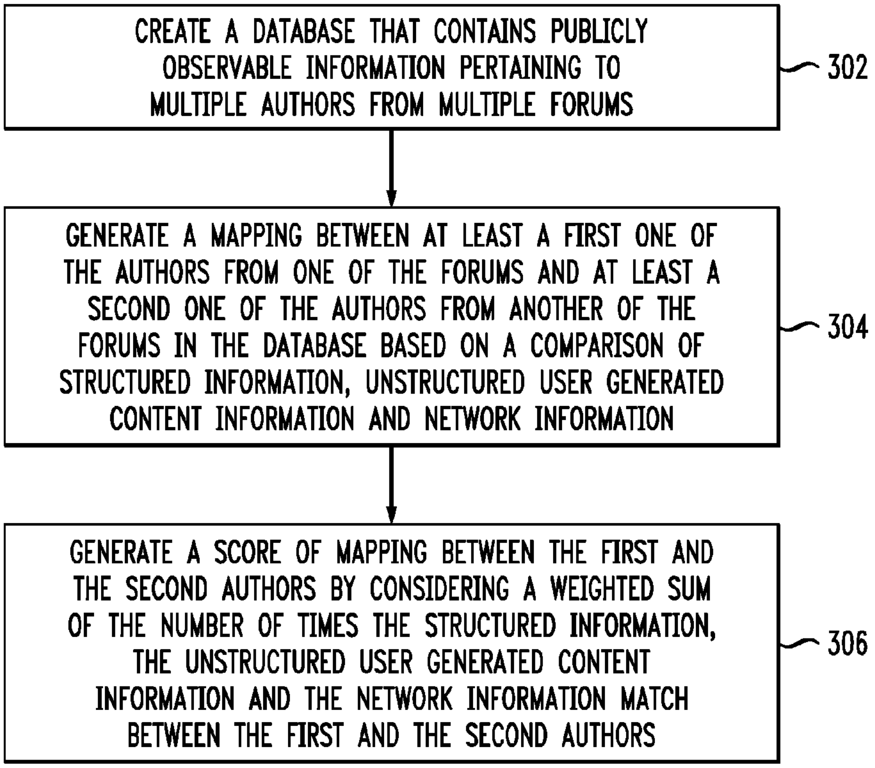
FIG. 3 is a flow diagram illustrating techniques for mapping authors across multiple forums, according to an embodiment of the invention.

FIG. 3 is a flow diagram illustrating techniques for mapping authors across multiple forums, according to an embodiment of the present invention. Step 302 includes creating a database that contains publicly observable information pertaining to multiple authors from multiple forums. Such information can include author handle, author name, friends list, author posts, profile information, location, gender, email address, telephone number, etc.

Step 304 includes generating a mapping between at least a first one of the authors from one of the forums and at least a second one of the authors from another of the forums in the database based on a comparison of structured information, unstructured user generated content information and network information.

Structured information can include information extracted, for example, from an author profile such as first name, last name, university, education, location, telephone number, email, etc. Unstructured user-generated content can include information extracted, for example, from content written by the author such as person names, movie names, product/service name, telephone number, emails, etc. Additionally, network information can include information such as, for example, a {friend, location} list of authors.

Step 306 includes generating a score of mapping between the first and the second authors by considering a weighted sum of the number of times the structured information, the unstructured user generated content information and the network information match between the first and the second authors. Additionally, at least one embodiment of the invention includes determining that the first and the second authors are the same person. Considering a weighted sum of the number of times structured information, unstructured user generated content information and network information match across authors can include assigning an individual weight to each item of structured information to denote the relative importance of the item of structured information.

The techniques depicted in FIG. 3 can also include outputting, to a database, pairs of authors across multiple forums and corresponding mapping scores for said pairs. Additionally, at least one embodiment of the invention includes determining mapping of extracted attributes based on author mappings, as well as determining synonyms of mappings for extracted attributes. At least one embodiment of the invention can also include refining author mappings based on attribute mapping and synonym determining.

Also, the techniques depicted in FIG. 3 can include refining a generated mapping by comparing content of authors from each mapping. Comparing content of authors from each mapping can include extracting information from written author content on a forum and matching written author content across multiple forums. Such written content can include mention of a named entity, a person's name, a telephone number, an email address, a uniform resource locator (URL), a location, a noun, a synonym of the noun, a spelling variant of the noun, etc. Additionally, at least one embodiment of the invention can include assigning a weight to each item of written author content.

As described herein, the multiple forums can include social media forums. Such embodiments of the invention can additionally include refining the generated mapping by considering at least one friend of one author on one forum mapped to at least one friend of another author on another forum. This can also include generating an implicit friends list for each author by considering each author's interactions among other individuals.

Further, as detailed herein, at least one of the multiple forums can be a targeted data forum such as, for example, a customer records database or a customer care log. Additionally, in an example embodiment of the invention, at least one of the multiple forums is a targeted data forum and at least one of the multiple forums is a social media forum. In such an embodiment, generating a mapping between at least one of the multiple authors from one of the multiple forums and at least one of the multiple authors from another of the multiple forums can include generating a mapping between at least one author from a social media forum and at least one customer from a targeted data forum.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
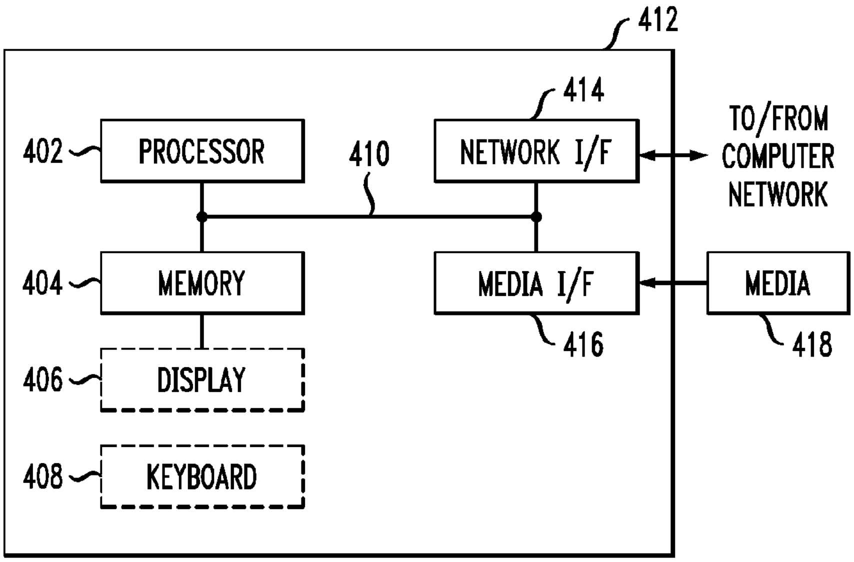
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, utilizing structured and unstructured data for disambiguating authors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for mapping authors across multiple social media forums, the method comprising:

creating a database that contains publicly observable information pertaining to multiple authors from multiple social media forums;

generating a mapping between at least a first one of the authors from a first of the social media forums and at least a second one of the authors from a second of the social media forums in the database based on a comparison of structured information comprising one or more identification details associated with a given author, unstructured user generated content information comprising one or more portions of written content generated by the given author, and network information;

refining the mapping by:

comparing a friend list associated with the first author on the first social media forum and a friend list associated with the second author on the second social media forum to identify one or more overlapping friend list entries; and comparing content of authors from each mapping by extracting information from written author content on a given social media forum, matching written author content across the multiple social media forums, and assigning a discrete weight to each item of written author content, wherein the written author content comprises mention of a named entity, a person's name, a telephone number, an email address, a uniform resource locator (URL), a location, a noun, a synonym of the noun, and a spelling variant of the noun, wherein each discrete weight defines an amount of relevance that the corresponding item of written author content has in connection with a task of matching two authors, wherein a higher weight indicates a higher amount of relevance, and wherein mention of a person's name is assigned a higher weight than mention of a noun, and mention of a noun is assigned a higher weight than mention of a synonym of the noun;

generating a score for the refined mapping between the first and the second authors by calculating:

a weighted sum of the number of times the structured information, the unstructured user generated content information and the network information match between the first and the second authors, wherein calculating the weighted sum comprises applying relative weightage, pre-determined by a user, to each item of structure information, unstructured user generated content information and network information, and adjusting the applied relative weightage based upon a correspondence to an exact match of given items of information versus a synonym matching of given items of information, wherein an exact match of given items of information results in an increased relative weightage adjustment applied thereto, and wherein a synonym matching of the given items of information results in a decreased relative weightage adjustment applied thereto, and the number of identified overlapping friend list entries associated with the first and the second authors, wherein the relative weightage denotes the relative importance of each given item of information; and determining, based on said generated score, that the first and the second authors are the same person;

wherein the steps are carried out by at least one computing device.

2. The method of claim 1, further comprising:

outputting, to a database, pairs of authors across the multiple social media and corresponding mapping scores for said pairs.

3. The method of claim 1, wherein generating a mapping comprises determining a mapping of extracted attributes based on author mappings.

4. The method of claim 3, comprising:

refining a mapping between two of the authors based on the mapping of extracted attributes.

5. The method of claim 3, wherein generating a mapping comprises determining synonyms of mappings for the extracted attributes.

6. The method of claim 5, comprising:

refining a mapping between two of the authors based on the synonyms.

7. The method of claim 1, wherein publicly observable information comprises at least one of author handle, author name, friends list, author posts, profile information, location, gender, email address, and telephone number.

8. The method of claim 1, wherein at least one of the multiple social media forums is a targeted data forum that comprises at least one of a customer records database and a customer care log.

9. An article of manufacture comprising a computer readable storage medium having computer readable instructions tangibly embodied thereon which, when implemented, cause a computer to carry out a plurality of method steps comprising:

creating a database that contains publicly observable information pertaining to multiple authors from multiple social media forums;

generating a mapping between at least a first one of the authors from a first of the social media forums and at least a second one of the authors from a second of the social media forums in the database based on a comparison of structured information comprising one or more identification details associated with a given author, unstructured user generated content information comprising one or more portions of written content generated by the given author, and network information;

refining the mapping by:

comparing a friend list associated with the first author on the first social media forum and a friend list associated with the second author on the second social media forum to identify one or more overlapping friend list entries; and comparing content of authors from each mapping by extracting information from written author content on a given social media forum, matching written author content across the multiple social media forums, and assigning a discrete weight to each item of written author content, wherein the written author content comprises mention of a named entity, a person's name, a telephone number, an email address, a uniform resource locator (URL), a location, a noun, a synonym of the noun, and a spelling variant of the noun, wherein each discrete weight defines an amount of relevance that the corresponding item of written author content has in connection with a task of matching two authors, wherein a higher weight indicates a higher amount of relevance, and wherein mention of a person's name is assigned a higher weight than mention of a noun, and mention of a noun is assigned a higher weight than mention of a synonym of the noun;

generating a score for the refined mapping between the first and the second authors by calculating:

a weighted sum of the number of times the structured information, the unstructured user generated content information and the network information match between the first and the second authors, wherein calculating the weighted sum comprises applying relative weightage, pre-determined by a user, to each item of structure information, unstructured user generated content information and network information, and adjusting the applied relative weightage based upon a correspondence to an exact match of given items of information versus a synonym matching of given items of information, wherein an exact match of given items of information results in an increased relative weightage adjustment applied thereto, and wherein a synonym matching of the given items of information results in a decreased relative weightage adjustment applied thereto, and the number of identified overlapping friend list entries associated with the first and the second authors, wherein the relative weightage denotes the relative importance of each given item of information; and determining, based on said generated score, that the first and the second authors are the same person.

10. A system for mapping authors across multiple social media forums, comprising:

a memory; and at least one processor coupled to the memory and configured for:

creating a database that contains publicly observable information pertaining to multiple authors from multiple social media forums;

generating a mapping between at least a first one of the authors from a first of the social media forums and at least a second one of the authors from a second of the social media forums in the database based on a comparison of structured information comprising one or more identification details associated with a given author, unstructured user generated content information comprising one or more portions of written content generated by the given author, and network information;

refining the mapping by:

comparing a friend list associated with the first author on the first social media forum and a friend list associated with the second author on the second social media forum to identify one or more overlapping friend list entries; and comparing content of authors from each mapping by extracting information from written author content on a given social media forum, matching written author content across the multiple social media forums, and assigning a discrete weight to each item of written author content, wherein the written author content comprises mention of a named entity, a person's name, a telephone number, an email address, a uniform resource locator (URL), a location, a noun, a synonym of the noun, and a spelling variant of the noun, wherein each discrete weight defines an amount of relevance that the corresponding item of written author content has in connection with a task of matching two authors, wherein a higher weight indicates a higher amount of relevance, and wherein mention of a person's name is assigned a higher weight than mention of a noun, and mention of a noun is assigned a higher weight than mention of a synonym of the noun;

generating a score for the refined mapping between the first and the second authors by calculating:

a weighted sum of the number of times the structured information, the unstructured user generated content information and the network information match between the first and the second authors, wherein calculating the weighted sum comprises applying relative weightage, pre-determined by a user, to each item of structure information, unstructured user generated content information and network information, and adjusting the applied relative weightage based upon a correspondence to an exact match of given items of information versus a synonym matching of given items of information, wherein an exact match of given items of information results in an increased relative weightage adjustment applied thereto, and wherein a synonym matching of the given items of information results in a decreased relative weightage adjustment applied thereto, and the number of identified overlapping friend list entries associated with the first and the second authors, wherein the relative weightage denotes the relative importance of each given item of information; and determining, based on said generated score, that the first and the second authors are the same person.

* * * * *